(12) United States Patent
LeCrone et al.

(10) Patent No.: US 6,250,871 B1
(45) Date of Patent: Jun. 26, 2001

(54) CONVEYOR FOR SELECTIVELY ROTATING BAKERY PANS

(75) Inventors: Dale J. LeCrone; Aaron Weaver; Ted Olney, all of Jackson; Richard J. Sackman, Rives Junction; Steve Bentley, Albion, all of MI (US)

(73) Assignee: LeMatic, Inc., Jackson, MI (US)

( * ) Notice: Subject to any disclaimer, the term of this patent is extended or adjusted under 35 U.S.C. 154(b) by 0 days.

(21) Appl. No.: 09/501,822

(22) Filed: Feb. 10, 2000

Related U.S. Application Data

(62) Division of application No. 09/156,449, filed on Sep. 19, 1998, now Pat. No. 6,059,892.

(51) Int. Cl.[7] ................................................ A21B 3/18
(52) U.S. Cl. .................................. 414/418; 414/384
(58) Field of Search ................................ 414/418, 425, 414/384

(56) References Cited

U.S. PATENT DOCUMENTS

| | | | | |
|---|---|---|---|---|
| 1,911,525 | * | 5/1933 | Neuman | 414/418 |
| 1,913,746 | * | 6/1933 | Butler | 414/418 |
| 2,271,937 | * | 2/1942 | Engels | 414/418 X |
| 2,485,373 | * | 10/1949 | Farrell | 414/418 X |
| 2,915,773 | | 12/1959 | Whelan . | |
| 5,649,474 | | 7/1997 | Seidel et al. . | |
| 5,817,361 | | 10/1998 | Campbell et al. . | |

FOREIGN PATENT DOCUMENTS

| | | | | |
|---|---|---|---|---|
| 4210387 | * | 10/1993 | (DE) | 414/418 |
| 1493562 | * | 11/1977 | (GB) | 414/418 |
| 1232614 | * | 5/1986 | (RU) | 414/425 |

* cited by examiner

*Primary Examiner*—Steven A. Bratlie
(74) *Attorney, Agent, or Firm*—Flynn, Thiel, Boutell & Tanis, P.C.

(57) ABSTRACT

A conveyor (20) for transporting and inverting strap pans (22) or other pans used for baking. The conveyor includes a closed-loop drive chain (26) to which a number of pan cars (54) are pivotally attached. The pan cars are provided with magnetic bars (36) that create attractive force to hold the strap pans to the pan cars. The conveyor also includes an incline guide (204). When the conveyor is actuated, the pan cars run against the incline guide so as to cause the initial inversion of the pan cars. As the pans cars are inverted they abut against a positioning rail located along side of the drive chain. The positioning rail is shaped to control both the rate at which the pan cars are inverted from their normal upright position and then it is further shaped to force the pan cars to then return to their initial upright position. The inversion of the pan cars causes a like inversion of the strap pans secured to the pan cars. Thus, this conveyor is used to invert pans so as to employ gravity in order to foster the removal of debris from the pans.

52 Claims, 10 Drawing Sheets

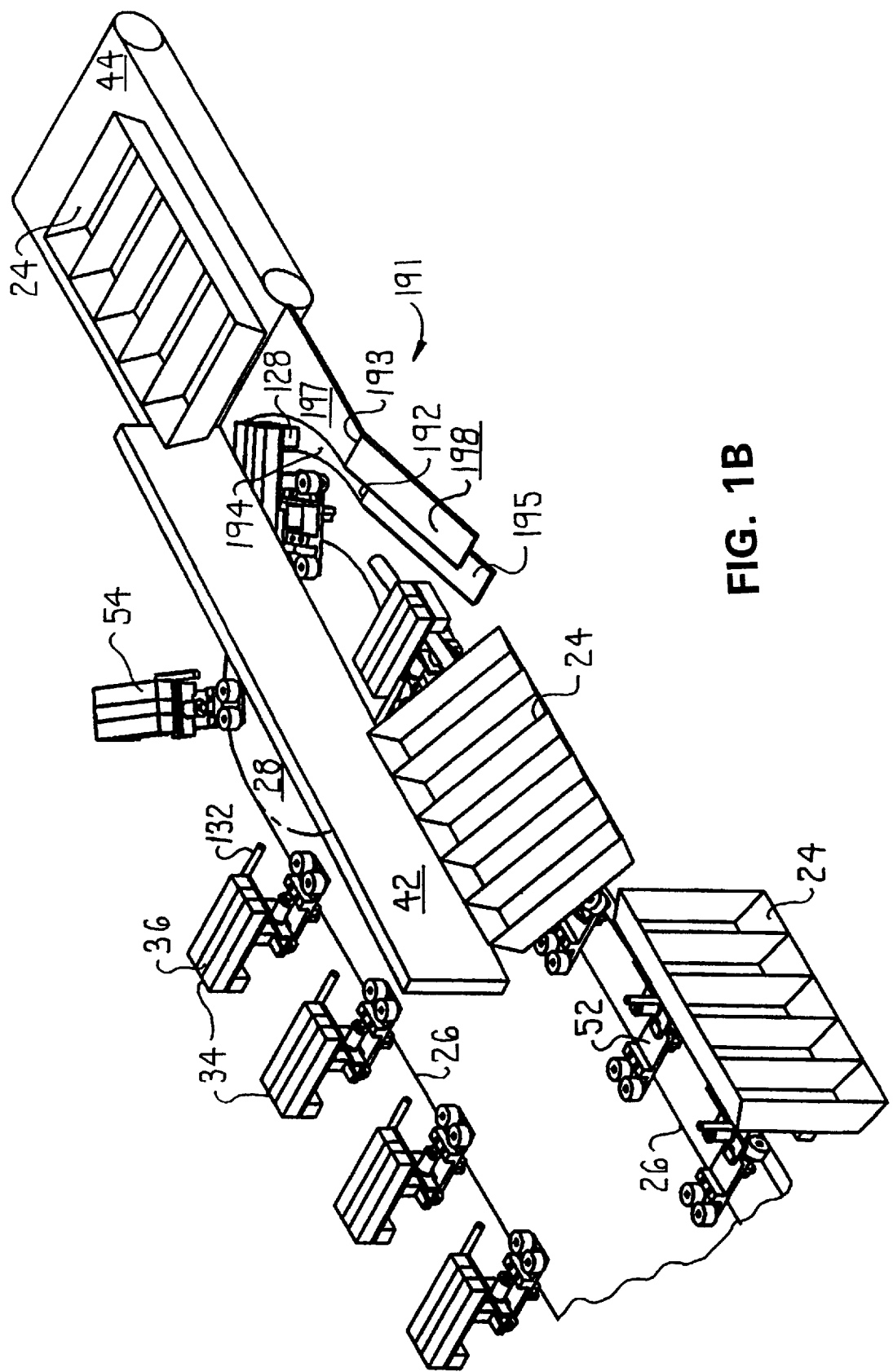

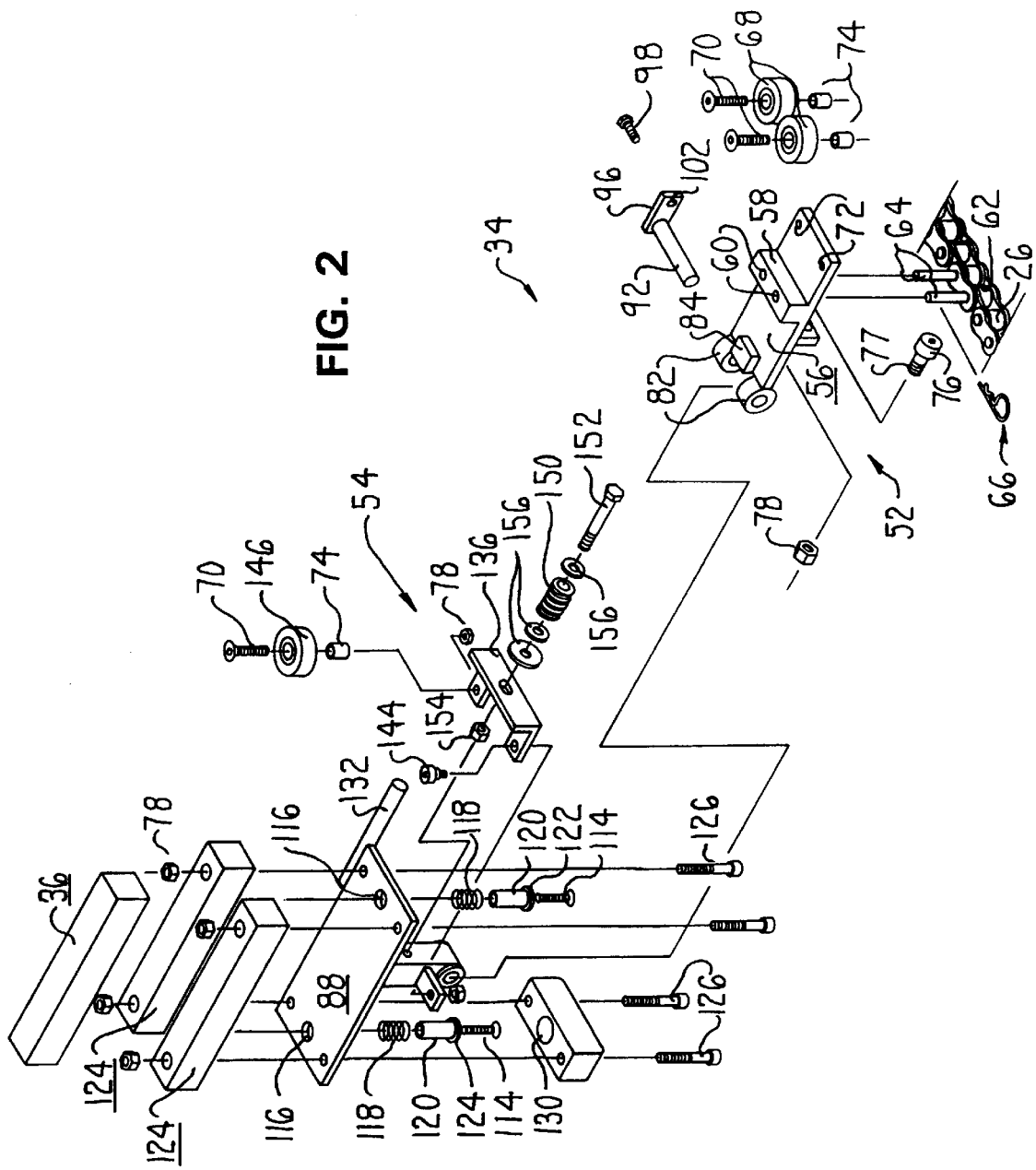

CONVEYOR FOR SELECTIVELY ROTATING BAKERY PANS

This is a division of Ser. No. 09/156,449, filed Sep. 19, 1998 now U.S. Pat. No. 6,059,892.

FIELD OF THE INVENTION

This invention relates generally to a conveyor for transporting bakery pans that are used in commercial baking establishments. More particularly, this invention is directed to a conveyor for rotating bakery pans to facilitate their emptying or their orientation for later handling.

BACKGROUND OF THE INVENTION

In commercial bakeries, breads, rolls, buns and other products are produced during the performance of a number of different processes steps which are performed on a continual basis. Typically, the dough from which these products are baked is placed in multiple pans that travel to the different processing locations by conveyors. To facilitate the movement of these pans, multiple pans are banded together so that they travel as a single unit to the different processing stations. The pans forming each set of pans are often referred to as strap pan since they are connected together by straps. In a typical bread baking process, a strap pan is first conveyed to a make-up station in which the raw dough is loaded into the individual pans. The strap pan then travels to a proofing area in which the dough is allowed to rise. Once the dough has risen, the strap pan is transported by conveyor into a oven in which the dough is baked so as to turn into bread. Once the baked bread exits the conveyor, it is removed from the individual pans, allowed to cool and packaged for shipment. The strap pan is then returned to the make-up station to be loaded with new dough.

An integral part of this bread baking process is the complete emptying of the individual pans after the bread or other products have been removed. This cleaning is necessary because crumbs or other debris from the fresh baked product often remain in the pan after the product is removed. If these debris are left in the pan, they are baked into the next product the pan is used to hold. At a minimum, this results in the next product having an aesthetically displeasing appearance and/or a taste that reflects the baked-in presence of these debris.

A more serious result can occur if the next product the pan is used to bake is different from the product the pan was last used to bake. In this situation, the debris remaining in the pan may be formed from ingredients that should not be present in the new product the pan is used to bake. The appearance of these debris in the new product can significantly affect the taste of the new product. Also, if the new product is not supposed to have certain ingredients and these ingredients are present in the baked-in debris, a person consuming the newly manufactured product may suffer an allergic reaction owing to the presence of these ingredients. Accordingly, an important part of the manufacturing process in a commercial bakery is the removal of debris from the baking pans after each use.

Numerous methods have been attempted to remove the debris from baking pans. For example, some systems rely on sets of brushes, blowers and/or vacuums to remove post baking debris. These systems work reasonably well for removing small, crumb-sized debris. However, these systems are not always effective for removing large debris or fully baked goods that may be lodged in a pan. This is because the blowers employed in these systems sometimes do not generate enough pressure to dislodge this relatively large material.

There have been other attempts to provide debris removal systems that operate by partially inverting the pans. Once a pan is inverted, it is a relatively simple matter to remove the debris by blowing a reasonable charge of pressured air stream into the pan. The combined forces of the air and gravity dislodge debris of all sizes and causes them to fall out of the pan. However, there are disadvantages associated with current pan-inverting systems. Typically, these systems include some type of rotating wheel, similar to a ferris wheel, on which strapped pans are individually loaded. Once the pans are loaded, the wheel is rotated to incline the pans and then unload them. A disadvantage of these systems is that the pan loading and wheel rotation steps are discrete activities; subsequent movement of the pans ceases until these steps are executed. In a modern commercial bakery, pans can be discharged from an oven at rates of up to 50 pans/minute wherein each pan is typically used to bake 5 loaves of bread. These current pan inverting systems, with their discrete movements, cannot be operated fast enough to invert these high volume numbers of pans. Also, some of these systems subject the pans to free fall movement that is only broken by the pan striking a hard surface. This shock loading can, over time, weaken the pans and significantly reduce their useful lifetimes.

SUMMARY OF THE INVENTION

This invention is directed to a system for conveying and selectively inclining bakery pans. More specifically, this invention is directed to a conveyor capable of continually receiving bakery pans and inclining them to a select orientation to foster debris removal. Since the conveyor moves continuously, it is able to, without interruption, continuously receive pans, invert them so as to cause their complete emptying, and return them to an upright orientation so they are again ready for use.

BRIEF DESCRIPTION OF THE DRAWINGS

The invention is pointed out with particularity in the claims. The above and further advantages of this invention are better understood by reference to the following description taken in conjunction with the accompanying drawings in which:

FIG. 1B is a perspective view illustrating the discharge station of the conveyor;

FIG. 2 is an exploded view of the components of a pan car assembly and how the pan car assembly is connected to the complementary drive chain;

DETAILED DESCRIPTION

Figure 1:
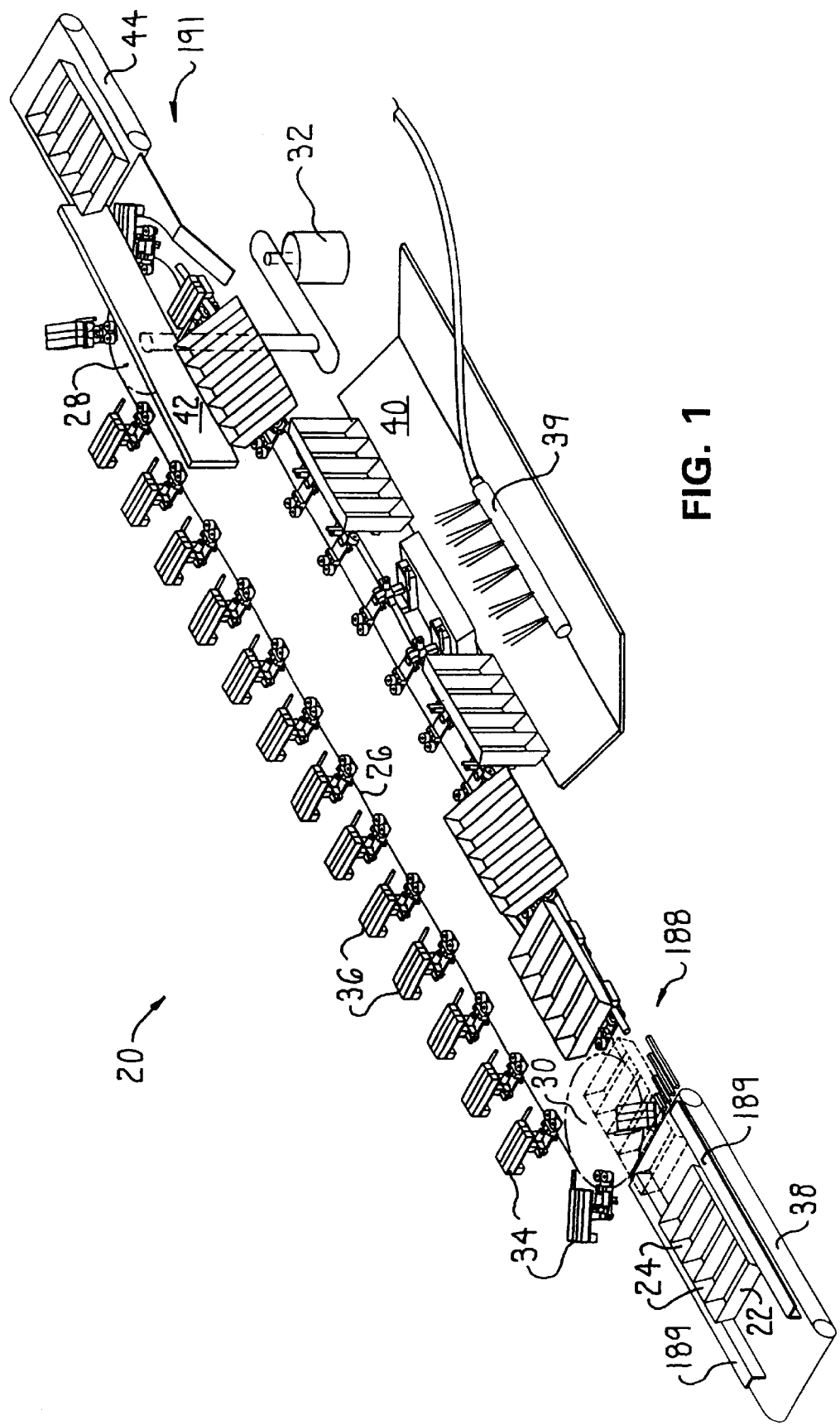
FIG. 1 is perspective view of depicting how a pan conveyor of this invention receives pans, inverts pans and returns the pans to their initial, upright, orientation.

FIG. 1 illustrates how a pan inverting conveyor 20 of this invention is employed to receive strap pans 22 employed in a commercial bakery, invert the pans in order to cause any debris in them to fall out, and return the pans to their initial, upright, state. Each strap pan 22 consists of a number of individual pans 24. In FIG. 1 the individual pans 24 are used for baking loaves of bread and, thus, are loaf-shaped.

Conveyor 20 includes a closed-loop drive chain 26, shown as an oval line in FIG. 1. Drive chain 26 is wrapped at one end around a drive sprocket 28 and at the opposed end around an idler sprocket 30, (sprockets shown in phantom). A motor 32, rotates the drive sprocket 28 in order to cause the movement of the drive chain 26 around sprockets 28 and 30. A number of pan car assemblies 34 are attached to the drive chain 26 to move with the drive chain. Each pan car assembly 34 includes a magnetic bar 36 that is located on the top of the assembly. At one end of the conveyor 20, adjacent idler sprocket 30, a magnetic infeed conveyor 38 moves each strap pan 22 over the pan car assemblies 34. The magnetic bars 36 of one or more pan car assemblies 34 hold the strap pan 22 so that the pan moves with the pan car assemblies. The sections of the pan car assemblies 34 on which the strap pan 22 rests are then inverted to cause the like inversion of the strap pan.

Once the strap pan 22 is inverted, a blower 39 applies a jet of air into the individual pans 24. The air jet and gravity collectively force any debris in the individual pans 24 out of the pans 24 into a waste chute 40 located below the conveyor 20. In some preferred versions of the invention, waste chute 40 extends under the whole of conveyor 20 to serve as a catch for debris that fall from the conveyor. Also, in some preferred versions of the invention, the waste chute 40 is an angled sheet of metal that extends diagonally downwardly toward one side of the conveyor 20; the debris thus fall to one side of the chute where they accumulate for easy collection.

Once the individual pans 24 are emptied, the inverted portion of the pan car assemblies 34 are righted. This righting motion returns the strap pans 22 to their initial, upright, orientation. Once the pan car assemblies 34 are righted, they rotate around drive sprocket 28. A baffle plate 42 extends over the drive sprocket 28 and the pan car assemblies. Baffle plate 42 blocks the continued rotation of the strap pans 22. Consequently, the strap pans 22 are forced off the conveyor 20 and onto a magnetic belt-type discharge conveyor 44. The discharge conveyor 44 moves the emptied strap pans 22 away from conveyor 20 and toward other pan handling equipment that either store the strap pans 22 or return them to a station at which they are again used.

Figure 2A:
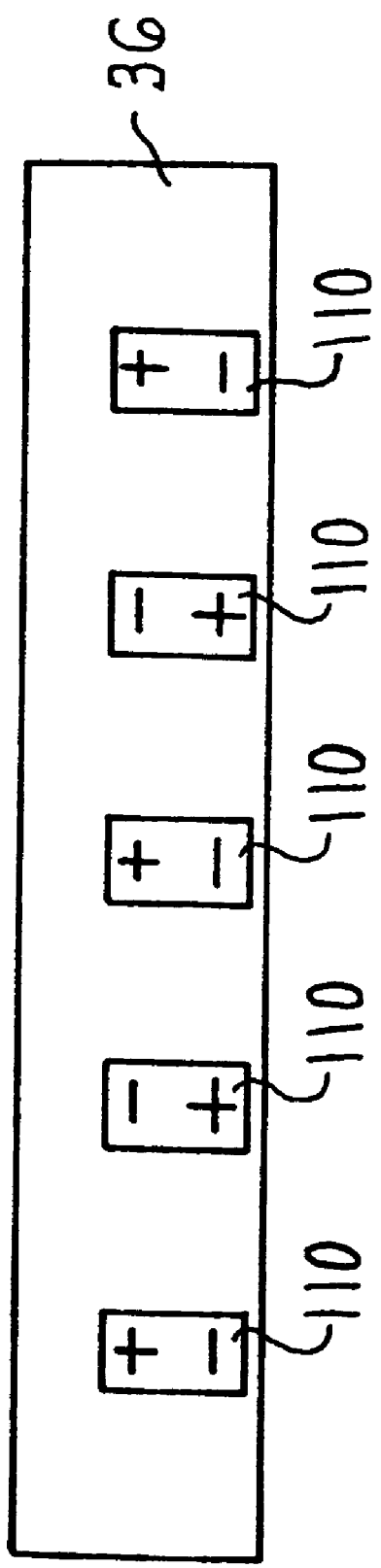
FIG. 2A is a diagrammatic illustration of the magnetic bar that is part of the pan car assembly.
Figure 3:
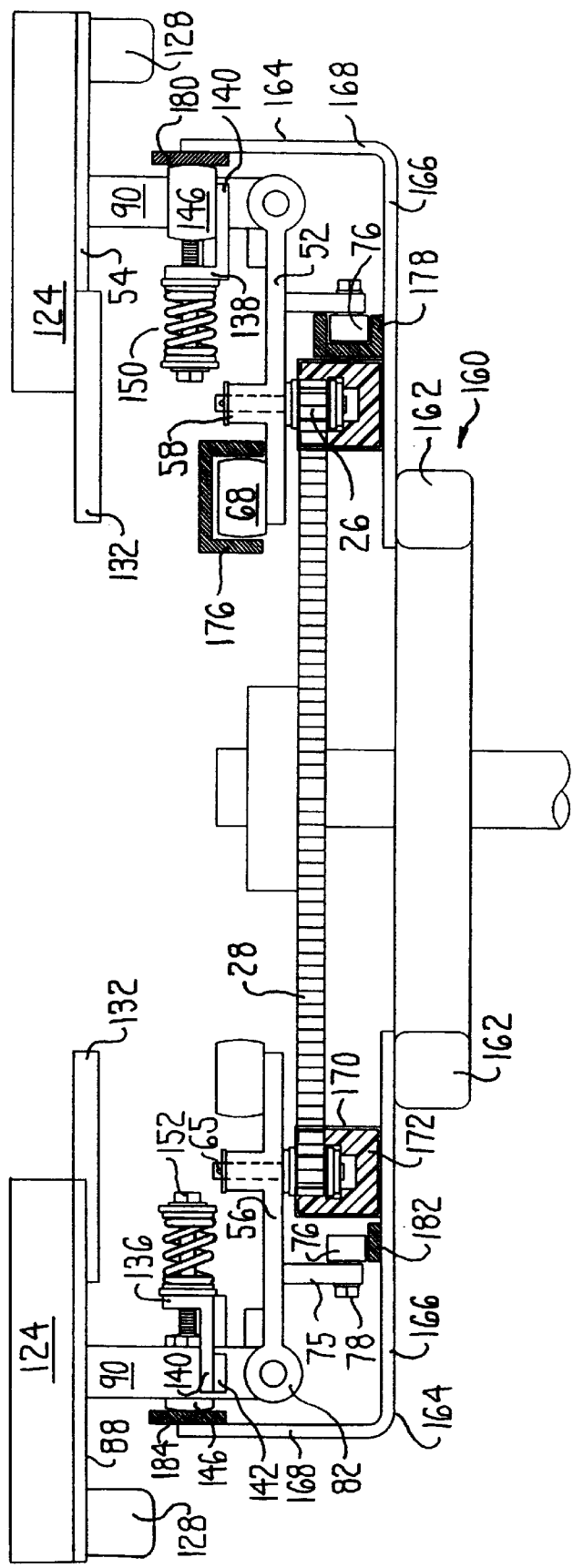
FIG. 3 is an end view depicting the conveyor.

FIGS. 2 and 3 depict the structure of the pan car assembly 34 and how the pan car assembly is mounted to the drive chain 26. The pan car assembly 34 includes a base 52, which is the component of the assembly attached to the drive chain 26. A pan car 54 is pivotally attached to the base 52; the pan car is the component of the assembly 34 to which the magnetic bar 36 is mounted.

The base 52 is formed generally of a plate 56 of metal. A block 58 is formed integrally with plate 56 and is located on the upper face of the plate in approximately the middle of the plate. Through bores 60 extend through plate 56 and block 58. Drive chain 26 has a number of spaced apart links 62 that are held to the rest of the chain by pins 64 that extend upwardly from the chain. The pan car assembly 34 is held to the chain by positioning the base 52 so the undersurface of plate 56 rests on the chain and pins 64 seat in bores 60. When the base 52 is so positioned, pins 64 extend above the upper face of block 58. A cotter key 66 fitted in through holes 65 formed in the exposed ends of pins 64 releasably secures the pan car assembly 34 to the drive chain 26.

Two rollers 68 are rotatably mounted to the inner end of the plate 56, the end directed toward the longitudinal axis of conveyor 20. Threaded fasteners 70 which seat in bores 72 formed in the end of the plate hold rollers 68 in place. Bushings 74 located around fasteners 70. A third roller 76 is also rotatably secured to plate 56. Roller 76 is rotatably mounted to a rectangular tab 75 that extends perpendicularly downward from the undersurface of plate 56. Tab 75 is located outwardly relative to block 58. Roller 76, which is vertically aligned, is mounted to tab 75 so that it is located on the inwardly facing face of the tab. A threaded boss 77 is coaxially formed with roller 76. Boss 77 extends through an opening in tab 75 and is held in place by a nut 78. The purposes of rollers 68 and 76 will be explained hereinafter.

Two spaced-apart, coaxially aligned annular sleeves 82 are mounted to the outer edge surface of plate 56. Sleeves 82 facilitate the coupling of the pan car 54 to the base 52 as is described below. A stop block 84 is welded to the outer end of the top of plate 56. Stop block 84 is located between sleeves 82.

Pan car 54 includes its own flat carrier plate 88 to which magnetic bar 36 is mounted. A generally rectangularly shaped connecting rod 90 extends downwardly from carrier plate 88. The end of connecting rod 90 is rounded and is located in the space between sleeves 82 of base 52. A pivot pin 92 extends through openings in sleeves 82 and an opening 94 in the end of connecting rod 90 to pivotal connect pan car 54 to base 52. Integral with the end of pivot pin 92 is a mounting plate 96. A threaded fastener 98 that extends through an opening 102 in mounting plate 96 and a complementary coaxial opening in the edge face of base plate 56 (base plate opening not identified) to hold the pivot pin 92 in place.

Magnetic bar 36 is formed from magnetically permeable material. As seen by reference to FIG. 2A, internal to magnetic bar 36 are five magnets 110, (shown in phantom). One suitable supplier of magnetic bar 36 is Industrial Magnetics of Boyne City, Mich. The magnetic bar 36 extends longitudinally across the carrier plate 88 along the center axis of the plate. Bolts 114, which extend through openings 116 formed in carrier plate 88, and into openings in the magnetic bar 36 (bar openings not illustrated) secure magnetic bar to the carrier plate. The bolts 114 are longer than the depth the carrier plate 88 and the bar openings in which they are seated so as that they allow the magnetic bar to have a limited range of movement relative to the carrier plate 88. Springs 118 that extend around the bolts 114 bias the bolts so as to urge the magnetic bar 36 towards the carrier plate 88. In the depicted version of the invention, each spring 118 is disposed around a generally sleeve-shaped spring retainer 120. Spring retainers 120 are located below carrier plate 88. Bolts 114 extend through the centers of the spring retainers. Each spring 118 is seated around the associated spring retainer 120 and extends between the undersurface of the carrier plate 88 and an outwardly directed lip 122 integrally formed with the spring retainer 120.

Two car blocks 124 are secured to the carrier plate 88 on either side of the magnetic bar 36. Car blocks 124 are formed out of non-magnetic material such as UHMW plastic. Threaded fasteners 126 secure the car blocks 124 to carrier plates 88. Collectively, the top surfaces of magnetic bar 36 and of car blocks 124 form the support surface on which the bottoms of the strap pans 22 rest.

A shoe 128 having a rectangular profile is attached the undersurface of the outwardly directed end of carrier plate 88. Shoe 128 is formed from the same material from which the car blocks 124 are formed. The threaded fasteners 126 that secure the overlying ends of car blocks 124 to carrier plate 88 hold shoe 128 in place. Shoe 128 is formed to have a bore 130 in which the innermost bolt 114, spring 118 and spring retainer 120 are seated.

A cam rod 132 is welded or otherwise secured to one of the sides of carrier plate 88. The cam rod 132 is positioned that it extends inwardly relative to the inner edge of the carrier plate 88.

A suspension arm 136 is secured to connecting rod 90. Suspension arm 136 is constructed out of a single piece of metal that has a vertically oriented main body 138 that extends laterally across the connecting rod adjacent the inwardly directed face of the connecting rod 90. Two flat, horizontally oriented fingers 140 integrally formed with main body 138 are located on the ends of the main body. Each of the fingers 140 extends across a separate one of the front and rear faces of the connecting rod 90. One finger 140, the finger located closest to the drive sprocket 28 as the pan car assembly 34 approaches idler sprocket 30, is pivotally mounted to tab 142 that extends perpendicularly forward from the connecting rod. Fasteners 144, in particular a shoulder bolt and a nut, pivotally hold the arm 140 to tab 142. A roller 146 is rotatably mounted to the second finger 140. A fastener 70 holds roller 146 in place. A bushing 74 is located between roller 146 and fastener 68.

A shock absorber assembly extends between the connecting rod 90 and the suspension arm 136 to dampen the extent the suspension arm can pivot. In the illustrated version of the invention, the shock absorber assembly includes a coil spring 150 that is fitted around a bolt 152 mounted to the suspension arm main body 138. Bolt 152 extends through an opening formed in suspension arm main body 138. The head of the bolt 152 is directed inwardly. A nut 154 is threaded around the end of bolt 152 is located between the suspension arm 136 and connecting rod 90. Spring 150 is located between the inside face of the suspension arm main body 138 and the head of the bolt 152. Washers 156 are located around the ends of the spring 150.

In FIG. 3, a frame 160 to which the static components of the conveyor 20 are mounted is shown diagrammatically. Frame 160 includes two horizontally extend primary support bars 162 that extend between the driver and idler sprockets 28 and 30, respectively. Not illustrated are the legs to which support bars 162 are mounted and that hold the support bars above the floor. number of mounting brackets 164 are mounted to each of the support bars 162. Each mounting bracket 164 has a horizontally extending section 166 that extends perpendicularly outwardly away from the support bar to which it is secured. Each mounting bracket 164 also has an upright section 168 that extends generally vertically away from associated horizontal section 166. As will be discussed hereinafter, the mounting bracket upright sections 168 associated with the inverting side of the conveyor 20, the side in which the pan cars 54 are inverted, are of different size and shape. The mounting bracket upright sections 168 associated with return side of the conveyor all extend generally perpendicularly upwardly from the horizontal sections 166 with which they are associated.

Drive chain 26 travels in chain guides 170 as it transits first from driver sprocket 28 to idler sprocket 30 and then back to drive sprocket 28. The chain guides 170 are mounted to the horizontal sections 166 of mounting brackets 164. Chain guides 170 are formed to have top openings through which the top of the drive chain 26 extend. In some preferred versions of the invention, the guide channels are formed of metal; internal to each channel is a sleeve 172 formed of a low friction plastic. Sleeve 172 is formed with a channel, (not identified) in which the drive chain 26 travels.

Two channel guides 176 and 178 are associated with drive chain 26. More particularly, channel guides 176 and 178 are located in the section of the conveyor 20 in which the pan cars 54 are inverted. Each channel guide 176 and 178 is a three sided structure. Channel guide 176 is located above and immediately inwardly of drive chain 26. Channel guide 176 is held in position by a set of arms that extend from frame support bars 162, (arms not illustrated). The channel guide 176 is positioned to receive rollers 68 as the pan car assemblies 34 transit this section of the conveyor 20. Channel guide 178 is secured to the adjacent mounting bracket horizontally extending sections 166 so as to be located slightly below and outside of the adjacent guide channel 170. The channel guide 178 is open to receive the rollers 76 when the pan cars 54 are inverted.

Figure 4:
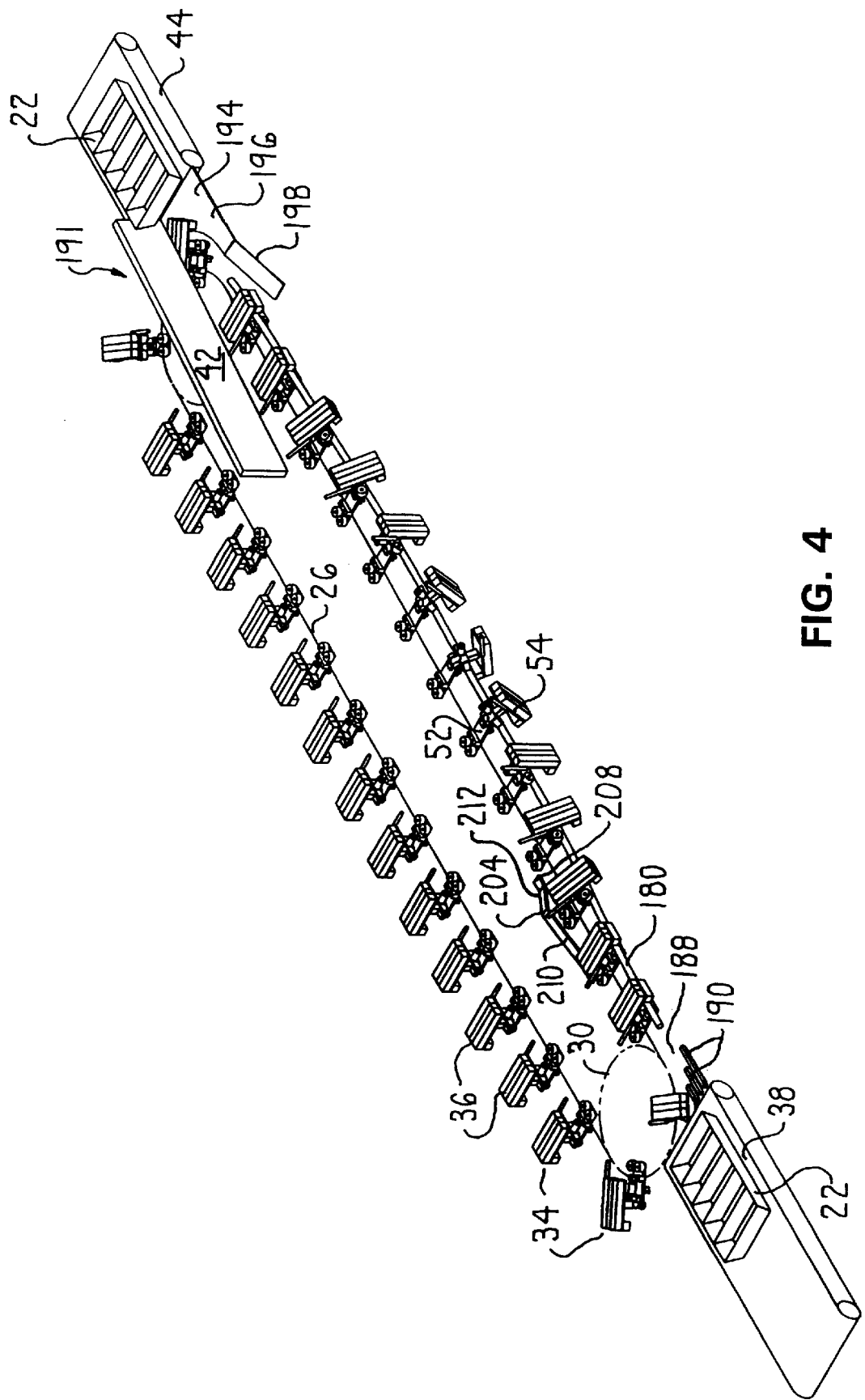
FIG. 4 is a perspective view depicting how individual pan cars of the pan car of this invention are inverted and returned to their initial, upright, orientation.
Figure 5:
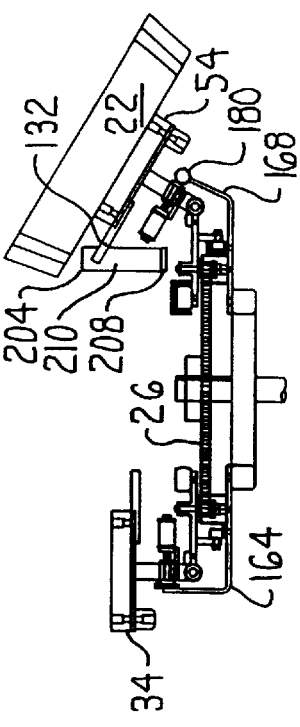
FIGS. 5, 6, 7, 8, 9, 10, 11 and 12 are end views that, collectively, depict how a pan car and the strap pan bonded to the pan car are displaced from the upright to the inverted positions as they move along the conveyor of this invention.
Figure 8:
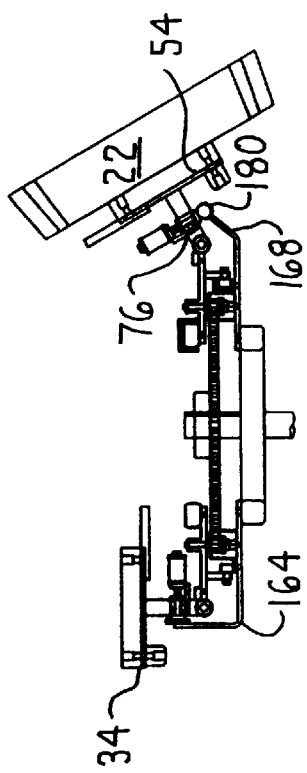
Figure 9:
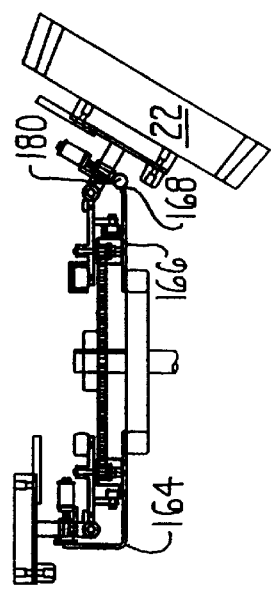
Figure 10:
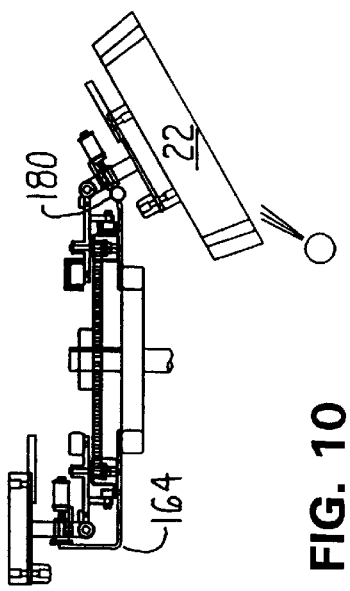

A positioning rail 180, seen best by reference to FIGS. 4 and 5, is secured to the ends of vertical sections 168 of the mounting brackets 164 along the inverting side of the conveyor 20. Positioning rail 180 is the static surface against which the pan car suspension arm rollers 146 abut when the pan cars 54 are inverted. The positioning rail 180 is attached to the ends of the adjacent mounting bracket upright sections 168. As can be seen by reference to FIGS. 4–12, the support brackets 164 and the positioning rail 180 are collectively shaped so that the position of the rail 180 relative to the drive chain 26 curves along the length of the conveyor 20. Adjacent idler sprocket 30, where the strap pans 22 are loaded onto the conveyor 20, positioning rail 180 is located close to the drive chain 26. At this location, the positioning rail 180 surface against which the rollers 146 rest is generally vertically oriented. At this location it will be noted that the associated mounting bracket 164 is formed so that the upright section 168 has a generally vertical orientation. Further along the conveyor 20, the positioning rail 180 bends outwardly and downwardly. For example, in FIG. 8 it will be noted that the surface against the roller 146 rests is approximately horizontally aligned. The mounting bracket 164 that holds the positioning rail 180 in this position is shaped so that the upright section 168 extends diagonally away from the horizontal section 166 with which the upright section 168 is integral. From FIG. 11 it will be observed that positioning rail 180 is positioned so that while the rail surface against which the roller 146 rests is almost vertical, the pan car 54 is essentially fully inverted. The mounting bracket 164 that holds the positioning rail 180 in this position does not have a distinct upright section; the positioning rail is mounted to the end of the horizontal section 166.

Figure 11:
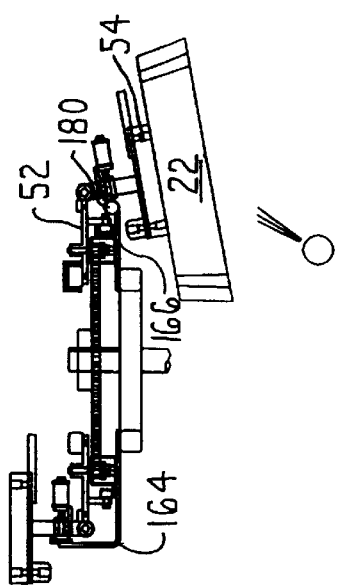
Figure 12:
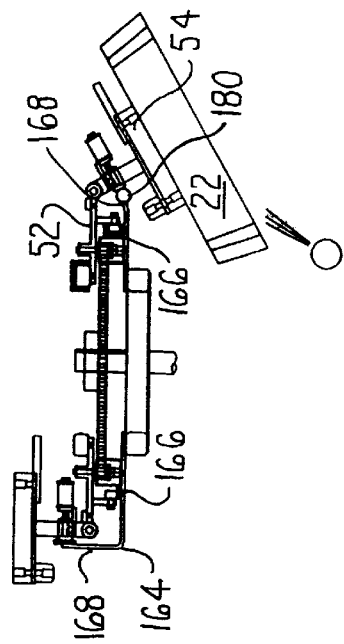

Positioning rail 180 is further shaped so that once it reaches the position depicted in FIG. 11, it curves back as it approaches drive sprocket 28. This curvature is depicted by FIGS. 4 and 12. In some versions of the invention, it has been found possible to employ a cylindrical, solid metal rod as the positioning rail 180. The rollers 146 travel over the outer surface of the rod.

Returning to FIG. 3 it can be seen that a planar, horizontally aligned support track 182 is mounted to the mounting bracket horizontal sections 166 on the return side of the conveyor 20, the side along which the upright pan cars 54 are returned to the idler sprocket 30. Pan car assembly rollers 76 rest on support track 182 when the pan car assemblies 34 transit this section of the conveyor 20. A flat, vertically oriented alignment bar 184 is mounted to the ends of the mounting bracket vertical sections 168 along the return side of the conveyor. Pan car rollers 146 rest against alignment bar 184 as the pan cars return to the infeed conveyor 38. Support bracket 182 and alignment bar 184 it should be understood are curved at the ends of the conveyor 20 so as to extend around both the drive and idler sprockets 28 and 30, respectively.

Figure 1A:
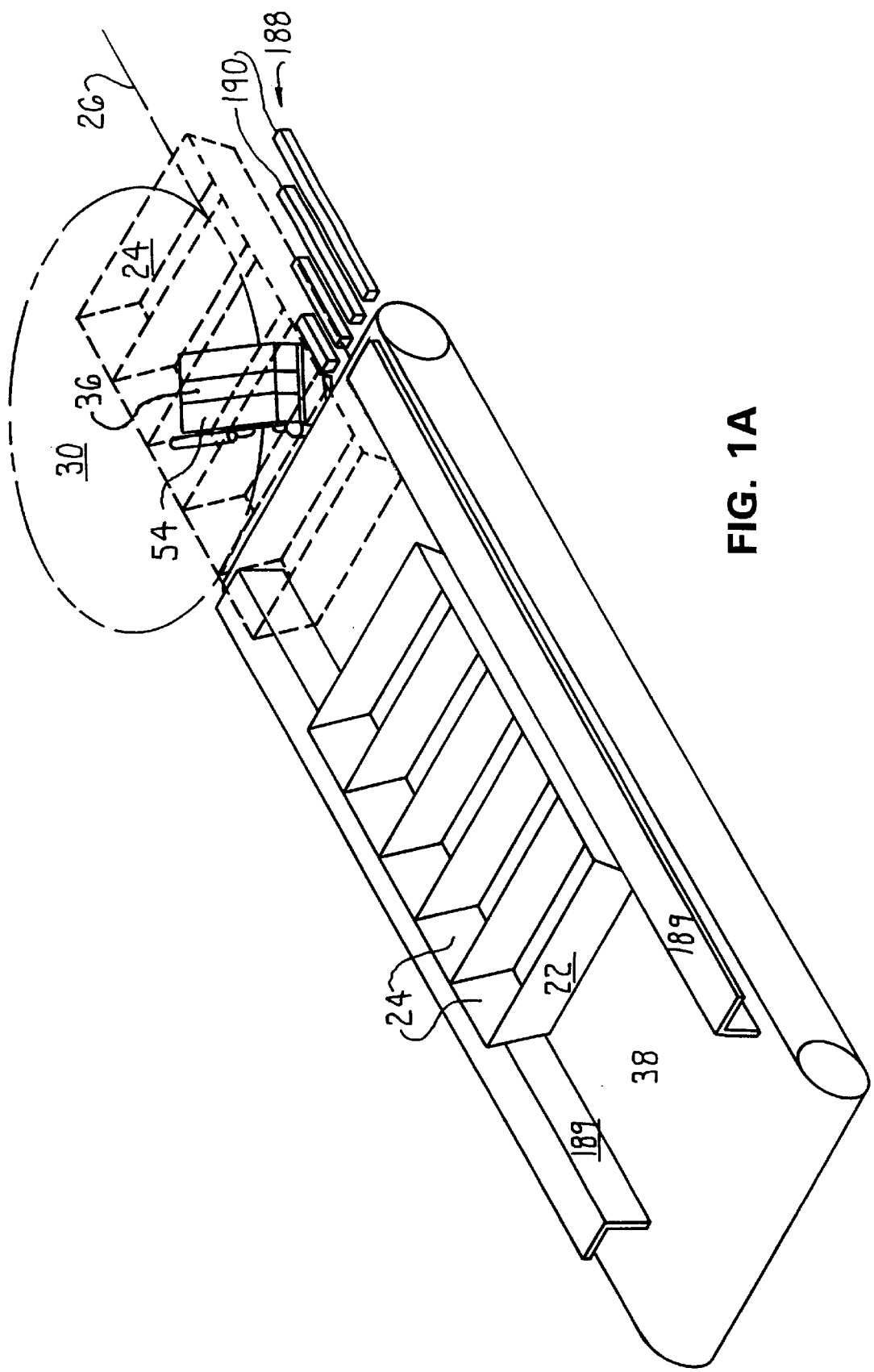
FIG. 1A is a perspective view illustrating the delivery station of the conveyor.

Conveyor 20 has a delivery station 188 located adjacent infeed conveyor 38, best seen by reference to FIG. 1A. Delivery station 188 includes a plurality of support bars 190 that extend between the end of the infeed conveyor and the space subtended by the pan cars 54 as they rotate around idler socket 30. Support bars 190 are formed from low friction material such as the UHMW plastic. The top surfaces of the support bars 190 are essentially flush with the adjacent top surfaces of the infeed conveyor 38 and the pan cars 54. Support bars 190 collectively form a surface over which the strap pans 24 travel as the pans move from infeed conveyor 38 to over the pan cars 54. Delivery station 188 includes a pair of parallel, spaced apart guide plates 189. Guide plates 189 extend over delivery conveyor 38 and the support bars 190. The guide plates 189 are spaced apart a distance sufficient to allow the strap pans 22 to transit between the plates.

As shown best in FIG. 1B, a discharge station 191 extends between drive sprocket 28 and discharge conveyor 44. Discharge station 191 includes lower and upper spaced apart support plates 192 and 193, respectively. Lower support plate 192 has a horizontally aligned arcuate section 194 that is coaxial with the center of drive sprocket 28 and spaced outwardly away from drive chain 26. A guide ramp 195 extends diagonally downwardly from the outer portion of the end arcuate section 194 that is directed towards idler sprocket 30. The lower support plate arcuate section 194 serves as the load bearing member against which the pan car shoes 128 rest when the pan cars turn around drive sprocket 28. Guide ramp 195 serves as catch plate to prevent the ends of the shoes from being caught on a leading edge of lower support plate 192.

Upper support plate 193 has a horizontally extending transfer section 197 that is approximately flush with the top surface of discharge conveyor 44. The leading edge of transfer section 197 has an arcuate profile that defines the space in which the pan car 54 transit as they turn around the drive sprocket 28. Transfer section 197 serves as the surface over which the strap pans 22 travel as the pans move from conveyor 20 onto discharge conveyor 44. A guide ramp 198 extends diagonally downwardly from transfer section 197 and is essentially parallel with guide ramp 195 of lower support plate 192. Guide ramp 198 serves as a catch plate to prevent the ends of the strap pans 22 from being caught on a leading edge of upper support plate 193.

Baffle plate 42 is also part of discharge station 191. The baffle plate 42 is positioned to extend from a position in which the drive chain 26 travels linearly, over the idler sprocket 30, over upper support plate 193 and ends adjacent the roller of the discharge conveyor 44 closest the delivery station 194.

Figure 6:
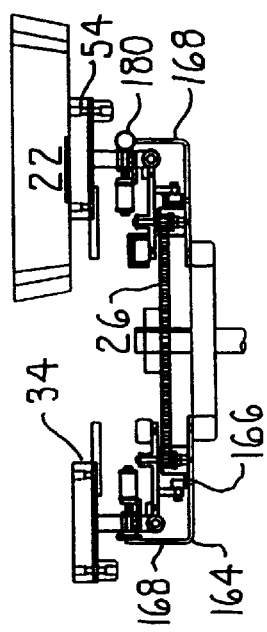
Figure 7:
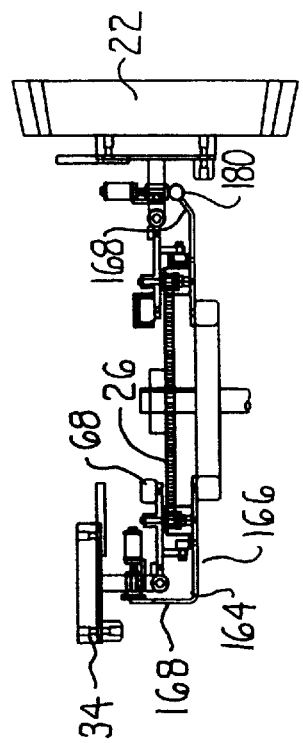

Conveyor 20 also includes an incline guide 204, depicted in FIGS. 4 and 6, which is located adjacent and inwardly relative to the section of the conveyor from which the drive chain 26 leaves the idler sprocket 30. Incline guide 204 is generally linear structure that has front and rear spaced apart feet 208 that are secured to the frame 160, (frame attachment points not shown). Extending rearwardly from the front foot 208, the foot closest to the idler sprocket 30, incline guide 204 is formed to have a diagonally upwardly directed incline ramp 210. A downwardly directed support leg 212 connects the upper end of ramp 210 to the rear foot 208. Incline guide 204 is formed of low friction plastic such as UHMW plastic. Incline guide 204 is secured to the frame 160 so that the cam rods 132 integral with the pan cars 54 travel over the incline ramp 210.

Conveyor 20 of this invention is employed to empty debris from the strap pans 22 after the products the pans are used to bake have been removed. Infeed conveyor 38 receives the pans 22 and moves them towards the conveyor delivery station 188. Guide plates 189 prevent lateral movement of the strap pans 22. The movement of the pans by the infeed conveyor 38 forces the pans over support bars 190 so that the leading edge of each pan extends forward of the support bars. Simultaneously with the movement of the strap pan 22 over the delivery station 188, drive chain 26 rotates the pan car 54 so that they transit in the space adjacent the support bars 190.

As a strap pan 22 is pushed over the ends of the support bars 190, the magnetic bar 36 of the pan car 54 transiting the space adjacent the support bars establishes a magnetic bond with the pan. This magnetic bond is sufficient to hold the strap pan 22 so that it both moves with the pan car 54 and does not fall off the pan car when the pan car is inverted. Typically, in a strap pan that is 24 to 40 inches (61–100 cm) long, the strap pan is transported by two or three pan cars assemblies 34.

As seen by reference to FIG. 5, when the strap pans 22 are initially secured to the pan cars 34, the pan cars are in their conventional horizontal orientation. Then as the pan car assemblies 34 move away from the delivery station 188, they approach the incline guide 204. Once a pan car assembly 34 reaches the incline guide 204, the cam rod 132 is forced to travel up the incline ramp 210 as depicted by FIG. 6. This displacement of the cam rod 132 causes the pan car 54 to which the cam rod is attached to pivot about pin 92. Typically, the incline guide 204 is shaped to cause the pan car 54 to pivot approximately 30 and 600. In more preferred versions of the invention, incline guide 204 is shaped to cause the pan car 54 to pivot between 40 and 50°. Since a single strap pan 22 is attached to plural pan cars 54, each of the pan cars to which the strap pan is attached simultaneously pivot.

Once the pan cars 54 and the strap pan 22 bonded thereto are initially inverted, momentum and gravity cause the pan car and strap pan to further invert as represented by FIGS. 7, 8, 9 and 10. Throughout the time each pan car is inverted its, roller 146 abuts positioning rail 180. The abutment of rollers 146 against rail 180 controls the rate at which the pan cars 54 and strap pans 22 are inverted. For each pan car assembly 34, spring 150 serves as a shock absorber that limits the shock loading of the assembly that results from roller 146 being forced against the rail 180.

During the time period the pan cars 54 and strap pans 22 are inverted, it will be noted that rollers 68 are seated channel guide 176 and rollers 76 are seated in channel guide 178. Consequently, the channel guides 176 and 178 stabilize the pan car bases 52 when their complementary pan cars are pivoted.

Eventually, as seen by FIG. 11, the pan cars and strap pan 22 attached thereto are inverted approximately 1800 from their initial orientation. When the strap pan 22 is so oriented, blower 39 applies a jet of air into the individual pans 24. The pressurized air and gravity collectively force any debris in the pans to fall out onto the waste chute 40 located below the blower 39.

After the pan car assemblies 34 and associated strap pan 22 pass the blower 39, positioning rail 180 is shaped to return to its position relatively close to and above the drive chain 26. Consequently, as the inverted pan cars 54 move along the conveyor 20, the action of the positioning rail 180 pressing against rollers 146 results in the righting of the pan cars 54 as represented by FIGS. 4 and 12. Before the pan car assemblies 34 reach the drive sprocket 28, the pan cars 54 and associated strap pans 22 are returned to their initial upright state. During this righting motion, the movement of the pan car 54 beyond its upright horizontal position is blocked by the abutment of the connecting rod 90 against stop block 84.

When the pan car assemblies 34 reach discharge station 191, the pan car shoes 128 travel over the arcuate section 194 of support plate 192. The pan car assemblies 54 are rotated around by drive sprocket 28 to start the transit back to the delivery station 188. Baffle plate 42 prevents the strap pans 22 from turning with the pan cars 54 to which the pans are attached. Instead, the strap pans 22 are moved over the transfer section 197 of the upper support plate 193. The magnet associated with discharge conveyor 44 generates a magnetic force on the pans 22 that help propel them over the upper support plate 193 and onto the discharge conveyor. The discharge conveyor 44, in turn, moves the strap pans 21 away from the conveyor 20 to a station at which the pans are either returned to a dough fill station for reuse or stored until needed.

Once the pan car assemblies 34 clear the drive sprocket 28, the drive chain 26 returns them to the delivery station 188. In this portion of the transit of the pan car assemblies 34, rollers 76 travel on support track 182. Rollers 146 rest against alignment bar 184. The abutment of rollers 146 against alignment bar 184 prevents the pan cars 54 from being displaced from their horizontally oriented upright position. Drive chain 26 then returns the pan car assemblies 34 to the delivery station 188 to that they are in a state to receive a new strap pan 22.

The conveyor 20 of this invention receives strap pans 22, inverts the pans to foster debris removal and return the pans to their upright positions.

The magnetic bars 36 that hold the pans 24 are approximately 6–10 inches (15–25 cm) long. Each bar 36 is provided with five closely spaced magnets 110. Owing to the close spacing of the magnets 110, the magnets collectively form a very dense magnetic field just above the top surface of the magnetic bar 36. This field provides sufficient force for attracting and holding the strap pans 24, which are formed from magnetic metal, in place.

Thus, when the strap pan 22 is pushed onto the conveyor 20 of this invention, a bond is immediately formed between the magnetic bars of the underlying pan cars 54 and the pan. This attachment occurs automatically, there is no need to precisely position the strap pans 22 relative to the pan cars to ensure that it occurs.

Still another feature of the conveyor 20 of this invention is that the magnetic bars 36 are able to move relative to the pan cars 54 to which the bars are connected. These loose mounting, as well as the biasing of the bars 36, allows the magnetic bars of the separate pan cars 54 to hold the flat bottom of a single strap pan bottom even though the adjacent pan cars themselves are not in the same plane.

Collectively, the foregoing features allow the conveyor of this invention to continuously, without a brake in the movement of the drive chain 26, receive and transport the strap pans 22. Once the strap pans are attached to the pan car assemblies, the conveyor inverts the pans to foster debris removal. After pan inversion, conveyor 20 returns the pans to their upright positions. Thus drive chain of this conveyor run continuously for example at speeds of up to 100 or 200 ft/min (30 to 61 m/min). Thus, the conveyor of this invention is able to receive and transport up to 50 pans of 40 inches (75 cm) for debris removal each minute.

Since the conveyor 20 of this invention inverts the strap pans 22, the force of gravity fosters the removal of debris from the pans onto the underlying waste chute 40.

Figure 13:
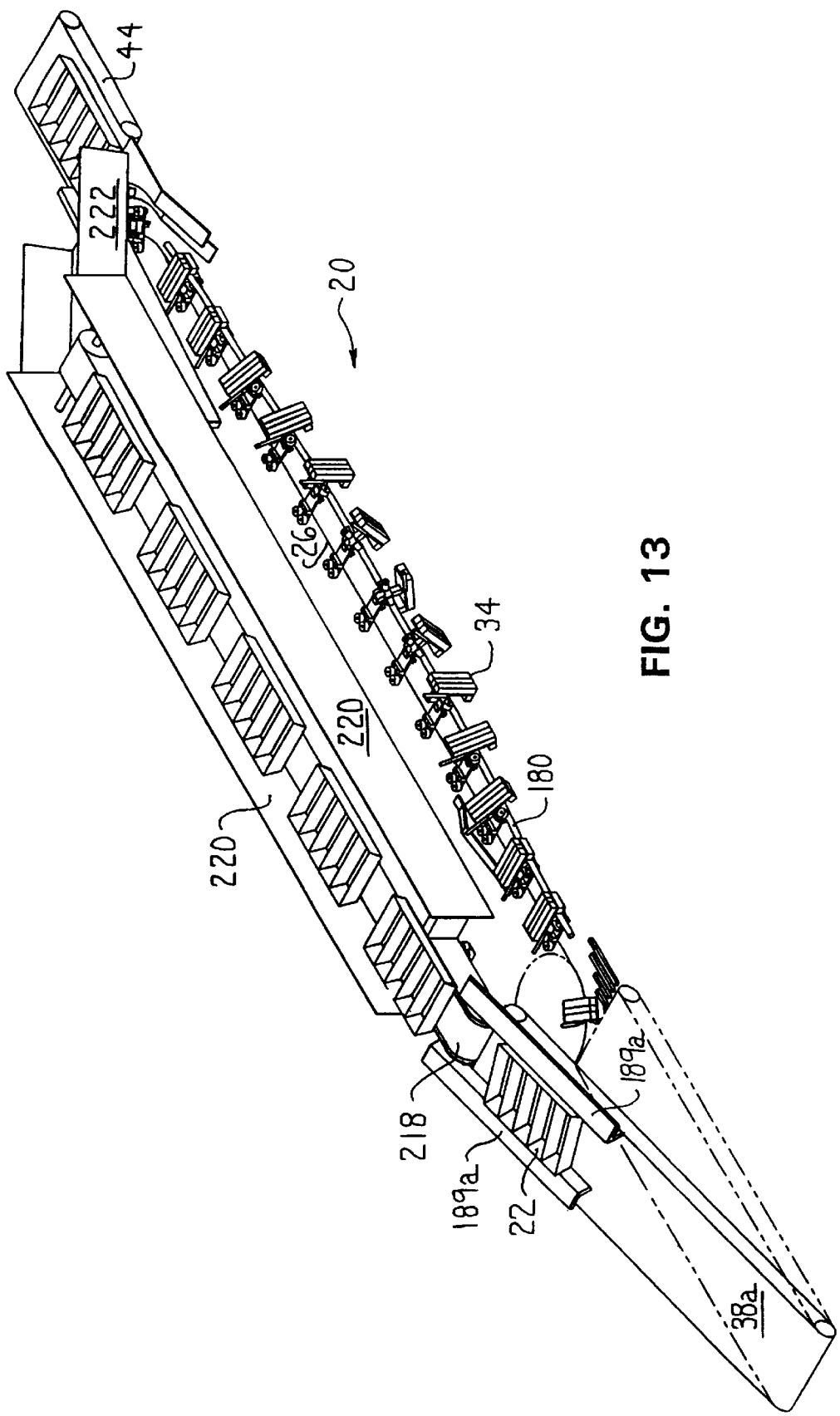
FIG. 13 is a perspective view of how a conveyor of this invention may be provided with an auxiliary, bypass, conveyor.

As depicted in FIG. 13, some versions of this invention may be provided with a bypass conveyor 218. Bypass conveyor 218 is located over the section of conveyor 20 along which the strap pans 22 normally transit. In this version of the invention, the conveyor 20 is provided with an infeed conveyor 38*a* capable of pivoting about the leading edge of the conveyor 38*a*, the edge along which the pans enter the conveyor 38*a*. A linear actuator, (not illustrated) attached to the trailing edge of conveyor 38*a* is capable of pivoting conveyor 38*a* up and down. In preferred versions of this embodiment of the invention, this linear actuator is a screw type actuator as opposed to a hydraulic actuator. Thus, in the event there is a power loss while the conveyor 38*a* is in the upwardly inclined state, the actuator will hold the conveyor 38*a* in the upwardly inclined position. The guide rails 189*a* of this version of the invention extend forward from the trailing edge of conveyor 38*a*.

The bypass conveyor 218 itself is horizontally aligned. Side panels 220 on either side of the conveyor help maintain the strap pans 22 on the conveyor. It will be noted that the forward end of conveyor 218 extends forward from the forward edges of the side panels. This forward end of the bypass conveyor 218 is relatively narrow in width. Thus, when the infeed conveyor 38*a* is pivoted upwardly, guide rails 189*a* pass along the opposed sides of the adjacent end of the bypass conveyor 218. When the infeed conveyor 38*a* is inclined, guide rails 189*a* thus keep the strap pans 22 moving in the forward direction as the pans move from the infeed conveyor 38*a* to the bypass conveyor 218.

A slide 222 is attached to the trailing end of the bypass conveyor 218. When the strap pans 22 reach the end of bypass conveyor 218, the bypass conveyor pushes the pans onto the slide 222. Gravity then causes the strap pans 22 to travel down the slide 222 onto the discharge conveyor 44. In some versions of the invention, slide 222 is pivotally attached to the frame structure that suspends bypass conveyor 218 above conveyor 20. Thus, when use of the bypass conveyor 218 is not needed, slide 222 is pivoted upwardly away from the discharge conveyor 44 to provide a clear path over which the strap pans can travel from the discharge station 191 to the discharge conveyor 44.

Bypass conveyor 218 provides a path around the main conveyor 20 of this invention. Thus, in the event conveyor 20 goes off-line for maintenance, malfunctions or its use is not required, the positions of both the infeed conveyor 38*a* and slide 222 can be set so that the bypass conveyor 218 moves the strap pans 22 around conveyor 20.

It should be recognized that the foregoing description has been limited to specific embodiments of the invention and that other embodiments of this invention may vary from what has been described. For example, other mechanisms may be provided for inverting the pan cars 54 and strap pans 22 and return them to their upright positions. For example, in some versions of the invention an outwardly directed cam rod may be attached to the suspension arm 136. The free end of this cam rod may be seated in a non-linear channel that provides the camming action need to both invert the pan car and return it to its upright position. Also, it may not be necessary to provide the pan car assemblies 34 of each version of this with base units. In these versions of the invention, the need to provide the channels to prevent bending of the base units are likewise eliminated.

Other means than the biased magnets and biased support arms may be provided to ensure that there is enough play in the components of the pan cars 54 to ensure that plural pan cars can hold a single strap pan 22.

Also, a single conveyor 20 of this invention need not be constructed to both invert and right the pans that are disposed on the conveyor. In some versions of this invention a baffle plate may be positioned below the drive chain and at the location at which the pan car 54 and strap pans 24 are inverted. When the baffle plate is so positioned, it prevents further motion of strap pans with the pan cars 54 so that the strap pans are forced off the conveyor while in the inverted state. In these embodiments of the invention, a discharge conveyor with a shock absorbing surface is positioned below the baffle plate to receive the strap pans as they are forced off the conveyor. This embodiment of the invention is useful when it is necessary to invert large numbers of strap pans on a continuous basis. For example, this type of conveyor is useful if it is desirable to transport the strap pans to cleaning station at which the pans are washed when they are in the inverted state. It should likewise be recognized that another conveyor of this invention can then be provided with pan cars that hold on to the pans and then return the pans to their upright orientation.

Moreover, while in the described version of the invention the strap pans 22 are inverted 180°, it should be recognized that this need not always be the case. In other versions of the invention, it may not be necessary to completely invert the pans. Also, in some versions of the invention, the pans may be delivered to the pan cars when the pans are already vertically aligned. This conveyor can then be used to tip the pan an addition 30 to 60° in order to foster debris removal.

Moreover, while the invention is described for use with pans used to bake loaf-shaped bread, it should be recognized that it can be used with pans used to bake other products that have different shapes, such as rolls, buns, and cakes. Clearly these pans have different shapes than the described strap pans. It should likewise be recognized that in versions of the invention built to transport and invert these pans, the shapes of the pan cars may vary with the size of the pans. Also, the shape and size of the magnets used to hold the pans may likewise vary with the type of pans the particular version of the conveyor 20 is intended to transport. Also, in some versions of the invention, it may be desirable to mount plural separate magnets to the pan cars 54 to provide the desired magnetic bonding.

Also, a single conveyor of this invention can be provided with a selectively positionable baffle plate. This would allow the conveyor to be used to simply invert the pans or to first invert and then right the pans.

Moreover, there is no requirement that the pan cars 54 be righted before they reach the drive sprocket 28 and start their return transit. In some versions of the invention, it may be desirable to delay righting of the pan cars 54 until immediately before they reach the delivery station 188. These versions of the invention would most often be constructed to transport pans that can be held to the conveyor 20 by the action of a single magnetic bar 36 of a single pan car 54.

In still other versions of this invention, brushes may be employed to further facilitate debris removal. For example, in some versions of the invention, it is contemplated that a fixed, free spinning or driven brush (or a combinations of brushes) will be mounted to the conveyor to dislodge debris before the pans are inverted. In still other versions of the invention, the brush, or brushes, may be positioned to dislodge the debris while the pans are being inverted, or while they are completely inverted.

Therefore, it is the object of the appended claims to cover all such modifications and variations that lie within the true spirit and scope of this invention.

The embodiments of the invention in which an exclusive property or privilege is claimed are defined as follows:

1. A pan turnover conveyor comprising:
   a closed-loop moving drive chain;
   a plurality of spaced apart pan cars that are attached to said drive chain, each said pan car having: a support unit having a member for releasably securing at least a portion of a pan to said support unit; and a first cam member and wherein, each said pan car is pivotally attached to said drive chain so that the support unit can pivot from an upright orientation and said securing member is configured to secure the pan to said support unit when said support unit is pivoted;
   an incline guide positioned adjacent said drive chain so that, as said pan cars move with said drive chain, said first cam member contacts said incline guide, wherein said incline guide is shaped to incline said first cam member so as to cause said pan car to pivot so that the pan car support unit pivots into a first inclined orientation; and
   a positioning rail positioned so that said pan cars abut said positioning rail after said pan cars are pivoted by said incline guide and said pan cars are clear of said incline guide, said positioning rail being shaped to regulate the orientation of said pan cars after the pivoting of said pan cars and being shaped to pivot said pan car support units back to the upright orientation.

2. The pan turnover conveyor of claim 1, wherein each said pan car includes a second cam member that is separate from said first cam member, wherein said second cam member is portioned to abut against said positioning rail so that the movement of said second cam member against said positioning rail causes said pan car support unit to moveto the upright orientation.

3. The pan turnover conveyor of claim 2, wherein each said pan car includes a shock absorber for connecting said second cam member to said pan car.

4. The pan turnover conveyor of claim 1, wherein said pan cars are constructed so that said members for securing pans are attached to said pan cars so that said securing members are able to engage in a limited range of movement while securing the pan so that the pans are able to engage in a limited range of movement relative to said support units.

5. The pan turnover conveyor of claim 1, wherein each said pan car has a magnet that functions as said member for securing a pan to said pan car support unit.

6. The pan turnover assembly of claim 1, wherein each said pan car has a base unit is located between each said support unit and said drive chain, wherein each said base unit is secured to said drive chain and each said support unit is pivotally attached to said base unit with which said support unit is associated.

7. The pan turnover assembly of claim 6, further including at least one support member for receiving said base units when said pan car support units are pivoted.

8. The pan turnover assembly of claim 1, wherein each said first cam is a rod that is positioned to abut against said incline guide.

9. The pan turnover conveyor of claim 1, further including a baffle plate positioned over a path of travel of said pan cars so as to block movement of pans secured to said pan car support units.

10. The pan turnover conveyor of claim 9, wherein said baffle plate is positioned to be located over said pan cars after said pan cars contact said positioning rail and said support units are returned to the upright orientation.

11. The pan turnover conveyor of claim 1, wherein:
said positioning rail is shaped so that, after said pan car support units are pivoted by said incline guide to the first inclined orientation, said positioning rail controls the motion of said support units so that said support units are further pivoted to to a second inclined orientation prior to said support units being returned to the upright orientation, the second inclined orientation being at an incline greater than the first inclined orientation.

12. The pan turnover conveyor of claim 11, wherein:
said positioning rail is shaped so that, when said support units are pivoted to the second inclined orientation, said support units are inclined so as to be in an inverted orientation; and
said support unit members for securing a pan are configured so that a plurality of members on adjacent said pan cars can hold single pan to said support units of said pan cars when said support units are in the inverted position.

13. The pan turnover conveyor of claim 1, wherein said support unit members for securing a pan are configured so that a plurality of members on adjacent said pan cars can hold a single pan to said support units of said pan cars when said support units are pivoted by said incline guide against said positioning rail.

14. A pan turnover conveyor including:
a closed-loop moving drive chain;
a plurality of pan car assemblies, each said pan car assembly having a base that is secured to said drive chain and a pan car that is pivotally secured to said base, said pan car having: a support surface for receiving a baking pan; a fastening device for releasably holding at least one section of a baking pan to the support surface when the pan car is pivoted; and first and second cam members wherein, when said pan car is pivoted, said support surface moves from an upright orientation to an inclined orientation;
an incline guide located adjacent said drive chain and positioned so that said first cam members abut said incline guide, wherein said incline guide is shaped so as to cause displacement of said first cam members that results in the pivoting of said pan cars so that said support surfaces move from the upright orientation to the inclined orientation; and
a positioning rail located adjacent said drive chain and positioned so that, after said first cam members are free of said incline guide, said second cam members abut said positioning rail, wherein said positioning rail is shaped so as to cause a displacement of said second cam members that results in said the pivoting of said pan cars so that said support surfaces move from the inclined orientation to the upright orientation.

15. The pan turnover conveyor of claim 14, wherein:
said incline guide is shaped to cause the displacement of said first cam members so that said first cam members cause the pivoting of said pan cars that results in inclination of said pan car support surfaces to a first inclined orientation; and
said positioning rail is further shaped so that after said incline guide causes initial pivoting of said pan cars, said positioning rail regulates further pivoting of said pan cars at a controlled rate that results in the pivoting of said pan car support surfaces to a second inclined orientation prior to said pan car support surfaces being returned to the upright orientation, the second inclined orientation being at an incline greater than the first inclined orientation.

16. The pan turnover conveyor of claim 15 further including an elongated member positioned adjacent said drive chain for imposing a restraining force on said pan car assembly bases when said pan cars are pivoted.

17. The pan turnover conveyor of claim 15, wherein:
said positioning rail is shaped so that, when said pan cars are pivoted to the second inclined orientation, said support surfaces are inclined so as to be in an inverted orientation; and
said pan car fastening devices are configured so that said fastening devices on adjacent said pan cars hold a single baking pan to said support surfaces of said pan cars when said support surfaces are in the inverted orientation.

18. The pan turnover conveyor of claim 17, wherein said positioning rail is shaped so that when said pan cars are in the second inclined orientation, said support surfaces are inverted 180° from the upright orientation.

19. The pan car turnover conveyor of claim 14, wherein each said second cam follower is a roller rotatably attached to said pan car with which said second cam follower is associated.

20. The pan turnover conveyor of claim 14, wherein said incline guide and said positioning rail are positioned to cause the pivoting and righting of said pan car support surfaces as said drive chain moves said pan car assemblies between first and second ends of the drive chain loop.

21. The pan turnover conveyor of claim 20, further including a baffle plate located over the second end of the drive chain loop.

22. The pan turnover conveyor of claim 14, wherein said fastening device for holding a baking pan to said support surface is a magnet attached to each said pan car.

23. The pan turnover conveyor of claim 14, wherein said fastening device for holding a baking pan to said support surface is attached to said pan car to have a limited range of movement relative to said support surface so that the baking pan is able to engage in a limited range of movement relative to said support surface.

24. The pan turnover conveyor of claim 14, further including a discharge station adjacent said drive chain at which baking pans are moved away from said pan cars, said discharge station being adjacent said drive chain at a location after said positioning rail has returned the pan car support surfaces to which the baking pans are held to the upright orientation.

25. The pan turnover conveyor of claim 14, wherein said pan car fastening devices are configured so that said fastening devices on adjacent said pan cars hold a single baking pan to said support surfaces of said pan cars when said support surfaces are moved from the upright orientation to the inclined orientation.

26. A pan turnover conveyor comprising:
a closed loop drive chain;
a plurality of pan cars that are pivotally secured to said drive chain, each said pan car having a support surface and a fastening device for releasably holding at least a portion of a baking pan to the support surface when the pan car is pivoted;

an incline member, said incline member positioned relative to said drive chain so that, as said pan cars travel with said drive chain, said pan cars abut said incline member and said incline member is shaped to pivot said pan cars from a first orientation to a second orientation; and a righting member, said righting member positioned relative to said drive chain and said incline member so that, after said pan cars are pivoted to the second orientation by said incline member and are spaced away from said incline member, said pan cars abut said righting member and said righting member is shaped to pivot said pan cars to a righted orientation.

27. The pan turnover conveyor of claim 26, wherein each said pan car fastening device is moveably secured to said pan car to have a limited degree of movement relative to the pan car support surface so that the baking pan is able to engage in a limited range of movement relative to said support surface.

28. The pan turnover conveyor of claim 26, further including: a delivery station located adjacent said drive chain at which baking pans are supplied to said pan cars; and a discharge station located adjacent said drive chain for receiving baking pans and moving baking pans away from said drive chain.

29. The pan turnover conveyor of claim 26, wherein said discharge station is positioned to receive baking pans after said pan cars to which the baking pans are held have been returned to the righted orientation.

30. The pan turnover conveyor of claim 26, wherein the first orientation of the pan cars is the righted orientation.

31. The pan turnover conveyor of claim 26, wherein said righting member is further configured to control the movement of said pan cars so that, after each said pan car is pivoted to the second orientation, said pan car is pivoted to a third orientation prior to said pan car being pivoted to the righted orientation, wherein the third orientation has a greater degree of angular offset from the first orientation than the second angular orientation has from the first orientation.

32. The pan turnover conveyor of claim 31, wherein:
said righting member is shaped so that, when said pan cars are pivoted to the third orientation, said support surfaces are inclined so as to be in an inverted orientation relative the first orientation; and
said pan car fastening devices are configured so that said fastening devices on a plurality of adjacent pan cars hold a single baking pan to said support surfaces of said pan cars as said pan cars are pivoted into the inverted orientation.

33. The pan turnover conveyor of claim 31, wherein said righting member is shaped so that, when said pan cars are pivoted to the third orientation, said support surfaces are inclined so as to be 180° inverted relative the first orientation; and
said pan car fastening devices are configured so that said fastening devices on a plurality of adjacent pan cars hold a single baking pan to said support surfaces of said pan cars as said pan cars are pivoted into the inverted position.

34. The pan turnover conveyor of claim 26 wherein, each said pan car includes: a first cam member positioned to abut said incline member; and a second cam member positioned to abut said righting member.

35. The pan turnover conveyor of claim 26, further including a baffle plate positioned over a path of travel of said pan cars so as to block movement of pans held to said pan cars.

36. The pan turnover conveyor of claim 35, wherein said baffle plate is positioned to be located over said pan cars after said righting member returns said pan cars to the righted orientation.

37. The pan turnover conveyor of claim 26, wherein said pan car fastening devices are configured so that said fastening devices on a plurality of adjacent pan cars hold a single baking pan to said support surfaces of said pan cars as said pan cars are pivoted to the second orientation.

38. A pan turnover conveyor including:
a closed-loop moving drive chain;
a plurality of pan car assemblies, each said pan car assembly having a base that is secured to said drive chain and a pan car that is pivotally secured to said base, said pan car including:
a support surface for receiving a baking pan wherein, when said pan car is pivoted, said support surface moves from an upright position to an inclined position;
a fastening device for releasably holding at least a portion of a baking pan against the support surface when the pan car is pivoted, said fastening device being configured to hold the baking pan when said support surface is in the inclined position and being secured to said pan car so as to have a limited range of motion relative to the support surface while holding the baking pan so that the baking pan has a limited range of motion relative to said support surface; and
first and second cam members;
an incline guide located adjacent said drive chain and positioned so that said first cam members abut said incline guide, wherein said incline guide is shaped so as to cause displacement of said first cam members that results in the pivoting of said pan cars so that said support surfaces move from the upright position to the inclined position; and
a positioning rail located adjacent said drive chain and positioned so that said second cam members abut said positioning rail, wherein said positioning rail is shaped so as to cause a displacement of said second cam members that results in the pivoting of said pan cars so that said support surfaces move from the inclined position to the upright position.

39. The pan turnover conveyor of claim 38, wherein:
said incline guide is shaped to cause the displacement of said first cam members so that said first cam members cause the pivoting of said pan cars that results in inclination of said pan car support surfaces to a first inclined orientation; and
said positioning rail is further shaped so that after said incline guide causes initial pivoting of said pan cars, said positioning rail regulates further pivoting of said pan cars at a controlled rate that results in the pivoting of said pan car support surfaces to a second inclined orientation prior to said pan car support surfaces being returned to the upright position, the second inclined orientation being at an incline greater than the first inclined orientation.

40. The pan turnover conveyor of claim 39, wherein said positioning rail is shaped so that, when said pan cars are pivoted to the second inclined orientation, said support surfaces are inclined so as to be in an inverted orientation.

41. The pan turnover conveyor of claim 39, wherein said positioning rail is shaped so that when said pan cars are in the second inclined orientation, said support surfaces are inverted 180° from the upright orientation.

42. The pan turnover conveyor of claim 38, further including an elongated member positioned adjacent said drive chain for imposing a restraining force on said pan car assembly bases when said pan cars are pivoted.

43. The pan turnover conveyor of claim 38, wherein said fastening device for holding a baking pan to said support surface is a magnet attached to each said pan car.

44. A pan turnover conveyor comprising:
   a closed loop drive chain;
   a plurality of pan cars that are pivotally secured to said drive chain, each said pan car having:
      a support surface; and
      a fastening device for releasably holding at least one section of a baking pan to the support surface when the pan car is pivoted, said fastening device being secured to said pan car to engage in limited movement relative to the support surface while holding the baking pan so that the baking pan has a limited range of motion relative to the support surface;
   an incline member, said incline member positioned relative to said drive chain so that as said pan cars travel with said drive chain, said pan cars abut said incline member and said incline member is shaped to pivot said pan cars from a first orientation to a second orientation; and
   a righting member, said righting member positioned relative to said drive chain so that after said pan cars abut said incline member, said pan cars abut said righting member and said righting member is shaped to pivot said pan cars to a righted orientation.

45. The pan turnover conveyor of claim 44, further including: a delivery station located adjacent said drive chain at which baking pans are supplied to said pan cars; and a discharge station located adjacent said drive chain for receiving baking pans and moving baking pans away from said drive chain.

46. The pan turnover conveyor of claim 45, wherein said discharge station is positioned to receive the baking pans after said pan cars to which the baking pans are secured have been returned to the righted orientation.

47. The pan turnover conveyor of claim 44, wherein the first orientation of the pan cars is the righted orientation.

48. The pan turnover conveyor of claim 44, wherein said righting member is further configured to control the movement of said pan cars so that, after each said pan car is pivoted to the second orientation, said pan car is pivoted to a third orientation prior to said pan car being pivoted to the righted orientation, wherein the third orientation has a greater degree of angular offset from the first orientation than the second orientation has from the first orientation.

49. The pan turnover conveyor of claim 48, wherein said righting member is shaped so that, when said pan cars are pivoted to the third orientation, said support surfaces are inclined so as to be in an inverted orientation relative the first orientation.

50. The pan turnover conveyor of claim 48, wherein said righting member is shaped so that, when said pan cars are pivoted to the third orientation, said support surfaces are inclined so as to be 180° inverted relative the first orientation.

51. The pan turnover conveyor of claim 44, wherein, each said pan car includes: a first cam member positioned to abut said incline member; and a second cam member positioned to abut said righting member.

52. The pan turnover conveyor of claim 44, further including a baffle plate positioned over a path of travel of said pan cars so as to block movement of pans held to said pan cars.

* * * * *

UNITED STATES PATENT AND TRADEMARK OFFICE
CERTIFICATE OF CORRECTION

PATENT NO. : 6,250,871 B1
DATED : June 26, 2001
INVENTOR(S) : Dale LeCrone et al.

It is certified that error appears in the above-identified patent and that said Letters Patent is hereby corrected as shown below:

Column 12,
Line 28, change "unit is located" to -- unit located --.

Column 14,
Line 31, change "cam follower" to -- cam member --.
Line 32, change "cam follower" to -- cam member --.

Column 15,
Line 29, change "of Claim 26" to -- of Claim 28 --.

Signed and Sealed this

Twenty-third Day of April, 2002

JAMES E. ROGAN
*Director of the United States Patent and Trademark Office*

*Attest:*

*Attesting Officer*